3,514,422
POLYESTERS CONTAINING CHLORINATED
GEM-DIMETHYL GROUPS
John R. Caldwell and Winston J. Jackson, Jr., Kingsport,
Tenn., assignors to Eastman Kodak Company, Rochester, N.Y., a corporation of New Jersey
No Drawing. Continuation-in-part of application Ser. No. 347,053, Feb. 24, 1964. This application Mar. 25, 1968, Ser. No. 715,504
Int. Cl. C08f 27/02
U.S. Cl. 260—30.4
19 Claims

ABSTRACT OF THE DISCLOSURE

Polyesters useful as fibers and films and containing gem-dimethyl groups are made self-extinguishing and soluble in low-boiling solvents (methylene chloride, chloroform, dioxane) by incorporating therein from about 5 to about 50 percent by weight of chlorine, said chlorine replacing the hydrogen atoms of said gem-dimethyl groups.

---

This application is a continuation-in-part of Caldwell and Jackson U.S. Ser. No. 347,053; filed Feb. 24, 1964 now abandoned.

This invention relates to novel, polymeric compositions and their preparations, and particularly concerns novel polyesters exhibiting a multiplicity of improved properties.

A great many polyesters, unfortunately, have one or more drawbacks, such as being highly flammable or insoluble in low-boiling solvents such as methylene chloride, chloroform, and dioxane. The limitations imposed by their flammability are, of course, obvious. These flammable polyesters find little use in fibers and films to be employed near open flames. Regarding their insolubility, they can only practicably be spun into fibers from their melts, which is costly and can lead to a certain amount of thermally induced degradation. Moreover, they cannot conveniently be cast or spun from the non-volatile solvents, such as tetrachloroethane and the like, in which they may be soluble because of the time and heat required to evaporate these solvents. In this regard, it is noted that the sustained heat required for drying solvents such as cresol, γ-butyrolactone, and ethylene carbonate, which boil above 200° C. and are employed to solubilize polyethylene terephthalate, can lead to considerable polymer degradation.

Objects of the present invention, therefore, are: to provide polyesters having good heat and hydrolytic stability and which exhibit significantly improved non-flammability and solubility characteristics; to provide polyesters which can be readily solubilized at relatively low temperatures and solution spun or otherwise formed; and to provide a commercially practicable process for preparing these polymers.

These and other objects in a general sense have been achieved in accordance with the present invention through the discovery that when polyesters containing relatively large amounts of gem-dimethyl groups are chlorinated by the process hereinafter disclosed, they become non-flammable and soluble in low-boiling solvents. In a more specific sense, the objects are achieved through the discoveries:

(1) that chlorine can be introduced into the preferred polyesters by chlorination of some of the methyl groups of the recurring gem-dimethyl groups in the structures:

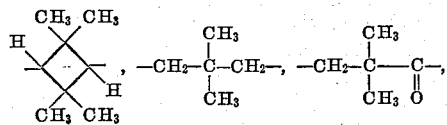

and

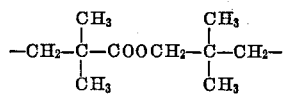

to form —CH$_2$Cl and —CHCl$_2$ groups and leave some —CH$_3$ groups without causing excessive polymer degradation;

(2) that such chlorination, to the proper degree, imparts the aforesaid desirable properties to the polymers as well as rendering them more thermally stable; and (3) that the more difficultly soluble polymers may be readily solubilized by a novel solvent system hereinafter disclosed, and thereby rendered readily chlorinatable.

By the term "gem-dimethyl group," we refer to the situation wherein two methyl groups are attached to the same carbon atom. These two methyl groups may then be referred to as "gem-dimethyl groups."

The present polymers may be defined, therefore, as a polymeric composition having an inherent viscosity of at least about 0.3, as measured at 25° C. using 0.25 gram of polymer in 100 ml. of chloroform, said polymeric composition containing at least about 80 percent by weight of a recurring structural unit selected from the group consisting of:

$$-O-R-O-C-R'-C-,\ -O-R-O-C-$$
$$\qquad\qquad\quad \underset{O}{\|}\qquad\underset{O}{\|}\qquad\qquad\qquad\underset{O}{\|}$$

and

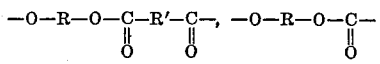

wherein R is a member selected from the group consisting of radicals of the formulas:

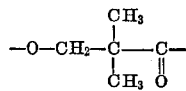

and

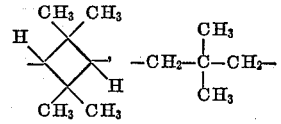

and wherein R' is a member selected from the group consisting of a direct carbon-to-carbon bond and divalent radicals of the formulas:

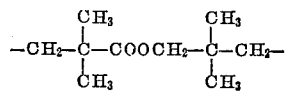

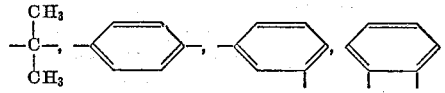

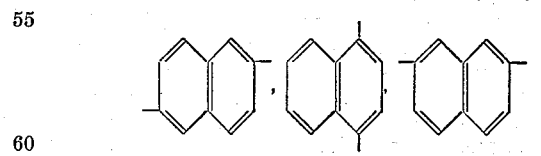

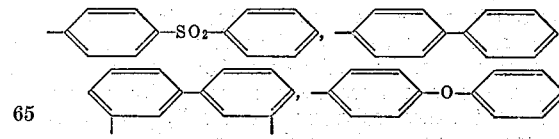

and

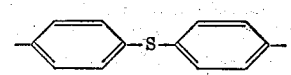

wherein the hydrogen atoms of the gem-dimethyl groups have been replaced by chlorine in an amount such that said polymeric composition contains from about 5 to about 50 percent by weight of chlorine.

The

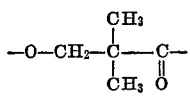

form of polymer is derived from the interaction of pivalolactone in the presence of catalytic amounts of a tertiary amine or acidic catalysts. The polymer may also be obtained by the self-condensation of hydroxypivalic acid. Because this polymer is very highly crystalline, it has little utility for fibers and molded, extruded, or pressed objects, and cast films thereof are brittle. Moreover, this polymer is insoluble in such relatively low-boiling solvents as methylene chloride, chloroform, and dioxane and, therefore, is difficult to cast into films and surface coatings which require, from a practical standpoint, rapid solvent evaporation.

Desirably, the degree of chlorine substitution is sufficient to give a chlorine content of between about 5 to 50 percent by weight of the polymer with between about 15 and about 40 percent by weight being preferred for most polymers. It is noted that precise quantitative analysis of —$CH_2Cl$ and —$CHCl_2$ group content is very difficult. However, it has been ascertained by nuclear magnetic resonance (NMR) that as between the two, the —$CH_2Cl$ groups predominate in the polymer. It is noted that where relatively low-average chlorine substitution is achieved, substantial amounts of —$CH_3$ groups are present, and where relatively high-average chlorine substitution is achieved, substantial amounts of —$CHCl_2$ groups are present. Of particular interest is the fact that the NMR analysis indicated practically no chlorine substitution on the aromatic rings. Therefore, NMR shows that it is the hydrogen atoms of the gem-dimethyl groups which have been replaced by chlorine.

The more conventional types of polyester reactants such as aliphatic dibasic acids and glycols may be co-reacted with diols and dibasic acids; however, the most thermally and hydrolytically stable polyesters are those containing at least about 80 percent by weight of the aforesaid preferred reactants. It is noted that the aromatic dibasic acid component may consist of up to 30 mole percent of oxalic or dimethylmalonic acid since neither of them present —$CH_2$— groups in the polymer chain.

The chlorination procedure comprises passing chlorine into solutions of the polymers in chlorinated hydrocarbons while illuminating with visible or ultraviolet light or while periodically adding a free-radical catalyst selected from the group, for example, of inorganic peroxygen, organic peroxygen, azo, and redox compounds. Examples of such catalysts are potassium persulfate; benzoyl peroxide; $\alpha,\alpha'$-azobisisobutyronitrile; and ammonium persulfate-sodium bisulfite. It is sometimes advantageous to use both a catalyst and illumination. The reaction may be carried out at 0° to 100° C., but temperatures of 10° to 40° C. are normally used. Appreciable degration of the polymers takes place at the higher temperatures, and chlorination proceeds very slowly at lower temperatures. Other chlorinating agents such as sulfuryl chloride, phosphorus pentachloride, and t-butyl hypochlorite may be used, but chlorine is most effective.

In the case of polyesters of tetramethylcyclobutanediol which are insoluble in the low-boiling chlorinated hydrocarbons such as methylene chloride and chloroform, it is necessary to use tetrachloroethane or pentachloroethane as the solvent for these polymers. It is usually possible to dissolve the polyesters of dimethylpropanediol in low-boiling solvents, but the chlorination is often more efficient when tetrachloroethane or pentachloroethane is employed since less chlorination of these solvents occurs.

It is not necessary for an HCl acceptor to be present in the system, but it is often advantageous to use water to remove the HCl from the organic phase and/or powdered calcium carbonate to neutralize the HCl. Less breakdown of the polymer during chlorination then occurs. After completion of the chlorination, the organic layer is washed with sodium bicarbonate solution to ensure neutralization of all of the HCl which has formed. If calcium carbonate is used in the reaction mixture and some carbonate remains, it is first removed by filtration or by adding a little acetic acid. After the polymer solution is thoroughly washed with water to remove all salts, it is slowly added to methyl alcohol or some other non-solvent to precipitate the polymer as a white fibrous product.

The preferred chlorination solvent is tetrachloroethane, but some of the polyesters are insoluble in this solvent; e.g., polypivalolactone and the polyester from terephthalic acid and trans - 2,2,4,4-tetramethyl - 1,3-cyclobutanediol. These polymers can be dissolved, however, if trichloroacetic or trifluoroacetic acid is added (5 to 50 percent by weight of the solvent mixture, depending upon the polymer). For example, polypivalolactone is not soluble in any of the common solvents, but is soluble in about 8/1 (by volume), methylene chloride/trifluoroacetic acid. When the polymer in this mixture is chlorinated, appreciable chlorination of the methylene chloride also occurs. The solvent system 83/17 (by weight), tetrachloroethane/trichloroacetic acid is chlorinated to a substantially less degree. Trichloroacetic acid and trifluoroacetic acid also increase the solubility of polyesters in saturated chlorinated hydrocarbons containing one to three carbon atoms and at least two chlorine atoms; e.g., methylene chloride, ethylene dichloride, chloroform, methylchloroform, tetrachloroethane, pentachloroethane, and pentachloropropane. When these trihalo acids are employed, water is not added because the trihalo acids are soluble in water, and calcium carbonate is not added because it reacts with the acid.

Under the conditions employed in chlorinating these polyesters substantially no chlorination of the aromatic rings occurs. The chlorinated polymers consist of mixtures containing —$CH_2Cl$ groups, unchlorinated —$CH_3$ groups, and —$CHCl_2$ groups. Normally, the polymers become self-extinguishing when at least about 28 percent by weight of chlorine is present therein. By "self-extinguishing" it is meant that a film of the polymer stops burning practically immediately when it is removed from a flame. Polymers containing more chlorine are even more resistant to burning. The polyesters of 2,2-dimethyl-1,3-propanediol are normally soluble in low-boiling solvents such as methylene chloride. The polyesters of 2,2,4,4 - tetramethyl - 1,3 - cyclobutanediol, on the other hand, are usually insoluble in such solvents, but the polymers containing 10 to 20 percent chlorine are soluble. These chlorinated polymers can be readily cast into films or spun into fibers from such solvents. Chlorinated polypivalolactone containing an average of about one chlorine atom per recurring unit is soluble in methylene chloride, and clear, tough films can be cast from the dope. When this polymer is chlorinated to an average of about two chlorine atoms per recurring unit, it is non-burning.

Chlorination of the polyesters increases the dielectric constants thereof and makes them more valuable for use as dielectrics. For example, the unchlorinatetd polyester of terephthalic acid and 2,2,4,4-tetramethyl-1,3-cyclobutanediol has a dielectric constant of 2.9 at 1 kc., whereas the polymer containing 30 percent chlorine has a dielectric constant of 3.6 at 1 kc. The heat stability of the chlorinated polyesters can be improved by adding 0.1 to 4 percent of a compound of one or more of the following types: organo tin sulfur, organo tin, epoxy, azirdinyl, urea phosphite, unsaturated aliphatic, fatty acid salt (cadmium, zinc, or tin), or powdered calcium carbonate. They can be added to films by dissolving or suspending in the dope from which the film is cast. They may be added to the polymer by dissolving or suspending in the dope from which the film is cast. They are added to the polymer by dissolving or suspending in a solvent such as methanol in which the polymer is soluble, adding the polymer, and then evaporating to dryness.

In this invention, the inherent viscosity (I.V.) of the unchlorinated polymer is generally at least about 0.4, as measured at 25° C. using 0.25 gram of polymer per 100 ml. of a solvent composed of 60 percent phenol and 40 percent tetrachloroethane. The inherent viscosity of the chlorinated polymer is generally at least about 0.3, as measured at 25° C. using 0.25 gram of polymer per 100 ml. of chloroform. The polyesters of tetramethylcyclobutanediol were prepared with the commercially available diol containing about a 40/60 cis/trans ratio.

The following examples are included for a better understanding of the invention. In these examples, percentages of chlorine are by weight, based on the weight of the chlorinated polymer.

EXAMPLE 1

A polyester prepared from dimethyl terephthalate and 2,2,4,4-tetramethyl-1,3-cyclobutanediol is chlorinated by the following procedure. The polymer (25 grams, inherent viscosity of 0.85) is dissolved in 200 ml. of tetrachloroethane by stirring at 100° C. After solution is attained and the mixture is cooled to room temperature, 200 ml. of water and 9.0 grams of calcium carbonate powder are added. While the mixture is stirred and irradiated with a 275 watt ultraviolet lamp, 13 grams of chlorine measured as the weight loss of the chlorine lecture bottle, is added during 40 minutes. The temperature is maintained at 25° to 35° C. by cooling with a water bath. The organic layer is then separated and stirred with some acetic acid to remove a small amount of calcium carbonate which has not reacted. It is then stirred with aqueous sodium bicarbonate solution to remove all acid. After the polymer solution is stirred with several portions of water, it is slowly added to methyl alcohol to precipitate the polymer as a white fibrous material. It has an inherent viscosity of 0.58 and a softening range of 205° to 216° C. The chlorine analysis indicates that 20.3 percent chlorine is present. The polymer, which is not self-extinguishing, is soluble in methylene chloride. A film, cast from this solvent, has the following properties: tensile strength=9,900 p.s.i., elongation=16 percent, modulus=3.3×$10^5$ p.s.i., two percent heat distortion temperature (at 50 p.s.i.)= 196° C., dielectric constant (at one kc. and 25° to 150° C.)=3.6–3.7, dissipation factor (at one kc. and 25° to 150° C.)=0.9 to 0.5 percent.

EXAMPLE 2

Example 1 is repeated but 50 percent more calcium carbonate and chlorine and added. The polymer has an inherent viscosity of 0.52 and a softening range of 218° to 220° C. The chlorine content of the polymer is 30.8 percent, indicating that somewhat over three chlorine atoms are present per diol unit. A film of the polymer, which is self-extinguishing, is cast from methylene chloride. It has the following properties: tensile strength= 9,800 p.s.i., elongation=17 percent, modulus=3.4×$10^5$ p.s.i., two percent heat-distortion temperature (at 50 p.s.i.)=184° C., dielectric constant (at one kc. and 25° to 150° C.)=3.6–3.8, dissipation factor (at one kc. and 25° to 150° C.)=1.2–0.6 percent.

EXAMPLE 3

Example 1 is repeated with omission of the calcium carbonate and addition of 26 grams of chlorine. The polymer has an inherent viscosity of 0.37 and a softening range of 207° to 216° C. The chlorine content of the polymer is 35 percent, indicating that about four chlorine atoms are present per diol unit. A film of the polymer, which is self-extinguishing, is cast from methylene chloride. It has the following properties: tensile strength=9,100 p.s.i., elongation=11 percent, modulus=3.2×$10^5$ p.s.i., two percent heat-distortion temperature (at 50 p.s.i.)=170° C., dielectric constant (at one kc. and 25° to 150° C.)= 3.5–3.6, dissipation factor (at one kc. and 25° to 150° C.)=0.9–0.7 percent.

EXAMPLE 4

A procedure similar to that of Example 1 is used but with certain modifications. The polyester (27.4 grams) is dissolved in 300 ml. of tetrachloroethane, and 200 ml. of water and 0.5 gram of benzoyl peroxide are added. The mixture is held at 28° to 30° C. and illuminated with a 300 watt flood lamp (visible light). Chlorine is passed into the stirred mixture until the loss in weight of the cylinder is six grams. A small sample of polymer solution is removed, and one gram more of chlorine is added to the original mixture. The sample and reaction mixture are then worked up as in Example 1. The first sample, which is not completely soluble in methylene chloride, contains 7.1 percent chlorine. The second portion is completely soluble in methylene chloride. It contains 9.1 percent chlorine and has an inherent viscosity of 0.65. A film, cast from methylene chloride, has the following properties: tensile strength=8,700 p.s.i., elongation=30 percent, modulus=2.8×$10^5$ p.s.i., two percent heat-distortion temperature (at 50 p.s.i.)=186° C.

EXAMPLE 5

A polyester prepared from 2,2,4,4-tetramethyl-1,3-cyclobutanediol and the dimethyl ester of 2,6-naphthalenedicarboxylic acid is chlorinated according to the method of Example 1; however, visible illumination is used, and the calcium carbonate is omitted. To 25 grams of the polymer is added 25 grams of chlorine. A chlorine analysis of the produce indicates that 29.4 percent chlorine is present. The polymer has an inherent viscosity of 0.62 and a softening range of 240° to 250° C. It is self-extinguishing and soluble in methylene chloride. At one kc. and 25° to 150° C., a film has a dielectric constant of 3.5–3.7 and a dissipation factor of 1.0–0.7 percent.

EXAMPLE 6

A polyester prepared from 2,2,4,4-tetramethyl-1,3-cyclobutanediol and diphenyl carbonate is chlorinated according to the method of Example 1 but with the addition of benzoyl peroxide. Ten grams of the polymer (inherent viscosity 0.52) and 0.5 gram of benzoyl peroxide are dissolved in tetrachloroethane, water and calcium carbonate are added, and 17 grams of chlorine are passed in. A chlorine analysis of the product indicates that 39.6 percent chlorine is present. The polymer has an inherent viscosity of 0.40 and a softening range of 180° to 200° C. A film of the polymer, which is self-extinguishing, is cast from methylene chloride. It has the following properties: tensile strength=9,600 p.s.i., elongation=4.9 percent, modulus=4.2×$10^5$ p.s.i., two percent heat-distortion temperature (at 50 p.s.i.)=135° C. At one kc. and 25° to 150° C. the film has a dielectric constant of 3.6–4.2 and a dissipation factor of 1.2–1.8 percent.

EXAMPLE 7

A polyester prepared from 2,2-dimethyl-1,3-propanediol and dimethyl terephthalate is chlorinated according to the method of Example 1 but with a reaction temperature of 10° C. To 16 grams of the polymer in tetrachloroethane are added 18 grams of chlorine. A chlorine analysis of the product indicates that 27.2 percent chlorine is present. The polymer has an inherent viscosity of 0.60 and a softening point of 120° C. It is self-extinguishing and soluble in methylene chloride. At one kc. and 25° C., a film has a dielectric constant of 3.5 and a dissipation factor of 0.8 percent.

EXAMPLE 8

A polyester prepared from 2,2-dimethyl-1,3-propanediol and the dimethyl ester of 2,6-naphthalenedicarboxylic acid is chlorinated according to the method of Example 1. To 28 grams of the polymer in tetrachloroethane are added 43 grams of chlorine. A chlorine analysis of the product indicates that 34.1 percent chlorine is present. The polymer has an inherent viscosity of 0.47 and a softening range of 150°–160° C. It is self-extinguishing and soluble in methylene chloride. At one kc. and 25° C., a film has a dielectric constant of 3.6 and a dissipation factor of 1.2 percent.

EXAMPLE 9

Example 1 is repeated without illumination but with the addition of 0.5 gram of acetyl peroxide. Whenever the chlorination slows down, 0.2 gram more of acetyl peroxide is added. The final polymer has an inherent viscosity of 0.55 and a chlorine content of 19.2 percent.

EXAMPLE 10

Example 9 is repeated with azoisobutyronitrile instead of acetyl peroxide. Similar results are obtained.

EXAMPLE 11

Ten grams of polypivalolactone (inherent viscosity of 2.8) are dissolved in a mixture containing 200 ml. of methylene chloride and 25 ml. of trifluoroacetic acid. While this solution is irradiated with a 275 watt ultraviolet lamp and a water bath holds the temperature at 25° to 30° C., 35 grams of chlorine is passed in. The mixture is then neutralized by stirring with sodium bicarbonate powder. The polymer solution is thoroughly washed with water and slowly added to methanol. The polymer precipitates as a white fibrous material. It has an inherent viscosity of 1.35, contains 23 percent chlorine, and is soluble in methylene chloride. A film cast from this solvent has the following tensile properties: break strength=4,600 p.s.i., yield strength=4,400 p.s.i., elongation=217 percent.

EXAMPLE 12

Example 11 is repeated with a polymer solvent comprising a mixture containing 150 ml. of tetrachloroethane and 50 grams of trichloroacetic acid. The mixture is heated to 80° to 90° C. to dissolve the polymer, cooled to 30° C., and 35 grams of chlorine are added while the temperature is held at 30° to 35 C. The polymer is then washed and isolated as before. It has an inherent viscosity of 0.74, contains 40.8 percent chlorine, and is soluble in methylene chloride. A film, cast from this solvent, is tough, flexible, and non-burning according to ASTM test D568–61.

EXAMPLE 13

Example 11 is repeated with a solvent comprising a mixture of 100 ml. of ethylene dichloride and 100 ml. of trifluoroacetic acid. The chlorinated polymer has an inherent viscosity of 1.18 and contains 24.2 percent chlorine. It is soluble in methylene chloride.

EXAMPLE 14

A polyester prepared from dimethyl terephthalate and the 3-hydroxy-2,2-dimethylpropyl ester of 3-hydroxy-2,2-dimethylpropionic acid is chlorinated by the procedure of Example 7. The product contains 22.6 percent chlorine and is soluble in methylene chloride. It is valuable as a fire-retardant protective coating.

The invention has been described in detail with particular reference to preferred embodiments thereof, but it will be understood that variations and modifications can be effected within the spirit and scope of the invention as described hereinabove and as defined in the appended claims.

We claim:

1. A polymeric composition having an inherent viscosity of at least about 0.3, as measured at 25° C. using 0.25 gram of polymer in 100 ml. of chloroform, said polymeric composition containing at least about 80 percent by weight of a recurring structural unit selected from the group consisting of:

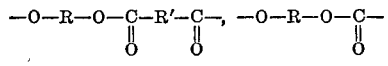

and

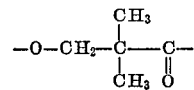

wherein R is a member selected from the group consisting of radicals of the formulas:

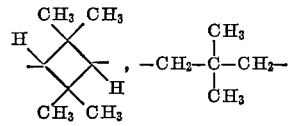

and

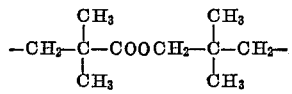

and wherein R' is a member selected from the group consisting of a direct carbon-to-carbon bond and divalent radicals of the formulas:

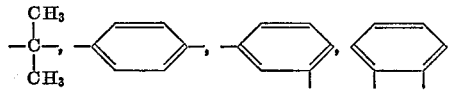

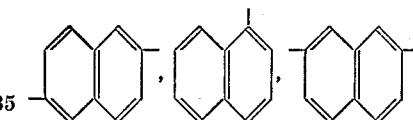

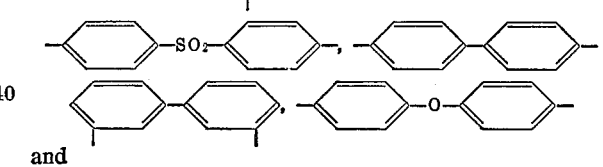

and

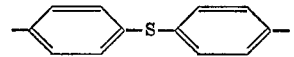

wherein the hydrogen atoms of the gem-dimethyl groups have been replaced by chlorine in an amount such that said polymeric composition contains from about 5 to about 50 percent by weight of chlorine.

2. A composition as defined by claim 1 wherein R is the

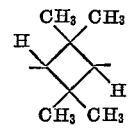

radical and R' is the

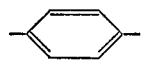

radical.

3. A composition as defined by claim 1 wherein R is the

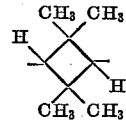

radical and R' is the

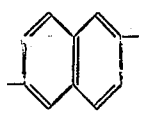

radical.

4. A composition as defined by claim 1 wherein R is the

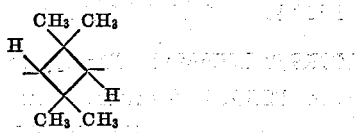

radical and R' is the

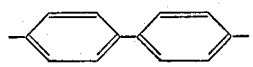

radical.

5. A composition as defined by claim 1 wherein R is the

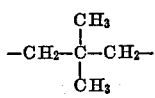

radical and R' is the

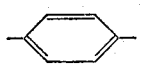

radical.

6. A composition as defined by claim 1 wherein R is the

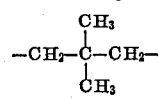

radical and R' is the

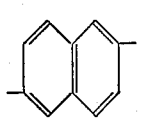

radical.

7. A composition as defined by claim 1 wherein the gem-dimethyl groups are sufficiently chlorinated to render the composition self-extinguishing.

8. A fiber formed from a composition as defined by claim 1.

9. A film formed from a composition as defined by claim 1.

10. A molded article formed from a composition as defined by claim 1.

11. A composition as defined by claim 1 wherein the gem-dimethyl groups are sufficiently chlorinated to render the composition soluble in at least one solvent selected from the group consisting of methylene chloride and chloroform.

12. A viscous dope of a composition as defined by claim 1 in at least one solvent selected from the group consisting of methylene chloride, chloroform, and dioxane.

13. A process for forming shaped articles from a composition as defined by claim 1, said process comprising forming a dope of said composition in at least one solvent selected from the group consisting of methylene chloride, chloroform, and dioxane, forming said dope into a shaped article, and evaporating the solvent.

14. A process for chlorinating a difficultly soluble polymeric composition as defined by claim 1, said process comprising dissolving the polymeric composition in a solvent mixture comprising a chlorinated hydrocarbon of from one to three carbon atoms and at least about five percent by weight of a trihalo acid, and contacting the dissolved polymeric composition at a temperature of from about 10° to about 40° C. with chlorine in the presence of a chlorination promoter.

15. A polyester of dimethyl terephthalate and the 3-hydroxy-2,2-dimethylpropyl ester of 3-hydroxy-2,2-dimethylpropionic acid wherein the hydrogen atoms of the gem-dimethyl groups have been replaced by chlorine in an amount such that said polyester contains from about 5 to about 50 percent by weight of chlorine.

16. A process for chlorinating a polymeric composition, said process comprising contacting a polymeric composition containing at least about 80 percent by weight of a recurring structural unit selected from the group consisting of:

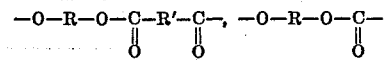

and

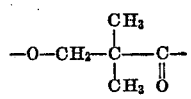

wherein R is a member selected from the group consisting of radicals of the formulas:

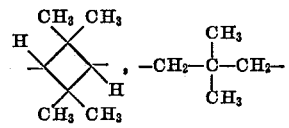

and

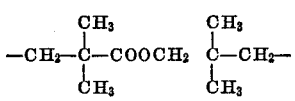

wherein R' is a member selected from the group consisting of a direct carbon-to-carbon bond and divalent radicals of the formulas:

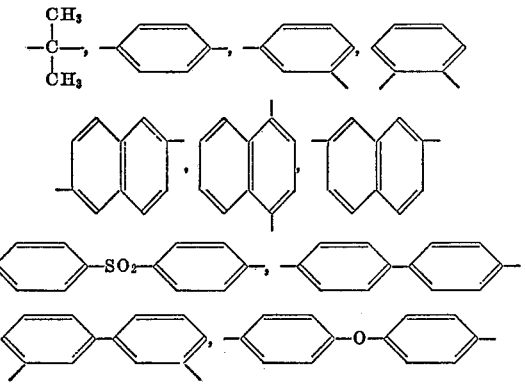

and

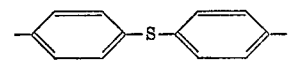

with chlorine at from about 0° to about 50° C. in the presence of a chlorination promoter, said chlorinated polymeric composition having an inherent viscosity of at least about 0.3, as measured at 25° C. using 0.25 gram of polymer in 100 ml. of chloroform, wherein the hydrogen atoms of the gem-dimethyl groups have been replaced in an amount such that said polymeric composition contains from about 5 to about 50 percent by weight of chlorine.

17. A process as defined by claim 16 wherein the chlorination promoter is selected from the group consisting of ultraviolet radiation, visible light, and a free radical initiator.

18. A process as defined by claim 16 wherein sufficient water is present to reduce the concentration of HCl in the organic phase and hence the tendency of the polymer to hydrolyze.

19. A process as defined by claim 16 wherein $CaCO_3$ is dispersed in the reaction medium to neutralize the HCl formed.

References Cited
UNITED STATES PATENTS

| | | | |
|---|---|---|---|
| 2,021,763 | 11/1935 | Bauer | 260—17 |
| 2,980,656 | 4/1961 | Jones et al. | 260—85.1 |
| 3,249,652 | 5/1966 | Quisenberry | 260—75 |
| 3,265,762 | 8/1966 | Quisenberry | 260—75 |
| 3,320,336 | 5/1967 | Duke et al. | 260—75 |

MORRIS LIEBMAN, Primary Examiner

S. M. PERSON, Assistant Examiner

U.S. Cl. X.R.

260—33.8, 65, 75, 78.3, 79, 96

PO-1050
(5/69)

UNITED STATES PATENT OFFICE
CERTIFICATE OF CORRECTION

Patent No. 3,514,422          Dated July 31, 1970

Inventor(s) John R. Caldwell and Winston J. Jackson, Jr.

It is certified that error appears in the above-identified patent and that said Letters Patent are hereby corrected as shown below:

Column 3, line 58, "degration" should read ---degradation---.
Column 4, line 56, "chlorine" should read ---chloride---.
Column 6, line 33, "produce" should read ---product---.
Column 7, line 44, "35 C." should read ---35°C.---.

Column 10, lines 25-29, the formula should appear as shown below:

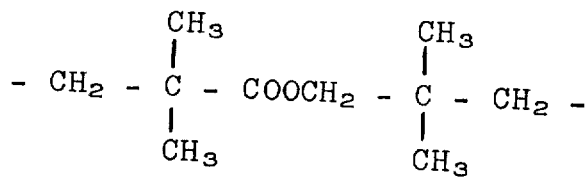

Signed and Sealed
OCT 20 1970

(SEAL)
Attest:

Edward M. Fletcher, Jr.
Attesting Officer

WILLIAM E. SCHUYLER, JR.
Commissioner of Patents